(12) United States Patent
Balamane et al.

(10) Patent No.: US 7,587,811 B2
(45) Date of Patent: Sep. 15, 2009

(54) METHOD FOR MANUFACTURING A MAGNETIC WRITE HEAD FOR PERPENDICULAR MAGNETIC DATA RECORDING

(75) Inventors: Hamid Balamane, Palo Alto, CA (US); Christian Rene Bonhote, San Jose, CA (US); Yimin Hsu, Sunnyvale, CA (US); Aaron Neuhaus, San Jose, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 391 days.

(21) Appl. No.: 11/411,561

(22) Filed: Apr. 25, 2006

(65) Prior Publication Data
US 2008/0002291 A1 Jan. 3, 2008

(51) Int. Cl.
*G11B 5/127* (2006.01)
*H04R 31/00* (2006.01)

(52) U.S. Cl. .............. 29/603.16; 29/603.07; 29/603.13; 29/603.14; 29/603.15; 29/603.18; 216/65; 360/121; 360/122; 360/317; 427/127; 427/128; 451/5; 451/41

(58) Field of Classification Search . 29/603.13–603.16, 29/603.18; 216/62, 65, 66; 360/121, 122, 360/317, 324–327; 451/5, 41
See application file for complete search history.

(56) References Cited
U.S. PATENT DOCUMENTS

| 6,540,928 | B1 | 4/2003 | Kobrin et al. | 216/22 |
|---|---|---|---|---|
| 6,641,984 | B2 | 11/2003 | Kamijima | 430/320 |
| 6,710,973 | B2 | 3/2004 | Okada et al. | 360/125 |
| 6,813,116 | B2 | 11/2004 | Nakamura et al. | 360/125 |
| 6,821,717 | B2 | 11/2004 | Lin et al. | 430/320 |
| 6,836,957 | B2 | 1/2005 | Kobayashi | 29/603.16 |
| 6,903,900 | B2 * | 6/2005 | Sato et al. | 360/125.12 |
| 6,952,325 | B2 * | 10/2005 | Sato et al. | 360/125.08 |
| 2003/0060055 | A1 | 3/2003 | Kamijima | 438/725 |

(Continued)

FOREIGN PATENT DOCUMENTS

GB 2415515 12/2005

(Continued)

OTHER PUBLICATIONS

Office Action Summary Translation from Chinese Application No. 2007101018642 mailed on Sep. 5, 2008.

*Primary Examiner*—Paul D Kim
(74) *Attorney, Agent, or Firm*—Zilka-Kotab, PC

(57) ABSTRACT

A method for manufacturing a magnetic write head for perpendicular magnetic recording having a write pole with a very narrow track width and well controlled critical dimensions. The write pole is formed by depositing an electrically conductive seed layer over a substrate, and then depositing a photo resist layer over the seed layer. The photo resist layer is photolithographically exposed and developed to form an opening or trench in the photoresist layer, the opening defining the pattern of the write pole. A magnetic material is then plated into the opening in the photoresist layer. The photo resist layer can then be removed by a chemical lift off, and portions of the seed layer that are not covered by the write pole can be removed by ion milling.

6 Claims, 13 Drawing Sheets

U.S. PATENT DOCUMENTS

| | | | |
|---|---|---|---|
| 2004/0032692 A1 | 2/2004 | Kobayashi | 360/126 |
| 2004/0223258 A1 | 11/2004 | Giorgis et al. | 360/126 |
| 2004/0257701 A1 | 12/2004 | Bedell et al. | 360/126 |
| 2005/0058952 A1 | 3/2005 | Chen et al. | 430/328 |
| 2005/0118329 A1 | 6/2005 | Kamijima | 427/127 |
| 2006/0010684 A1 | 1/2006 | Lee et al. | 29/603.15 |

FOREIGN PATENT DOCUMENTS

| | | |
|---|---|---|
| WO | 02/054458 A2 | 7/2002 |
| WO | 02/059882 A2 | 8/2002 |

* cited by examiner

METHOD FOR MANUFACTURING A MAGNETIC WRITE HEAD FOR PERPENDICULAR MAGNETIC DATA RECORDING

FIELD OF THE INVENTION

The present invention relates to magnetic data recording, and more particularly to a method for manufacturing a very narrow track width write pole in a perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In order to meet the ever increasing demand for improved data rate and data capacity, researchers have been focusing on developing perpendicular magnetic recording systems. A perpendicular magnetic write head includes a magnetic write pole and a return pole, the write pole and return pole being magnetically connected at location removed from the write gap. A write field from the write pole writes a magnetic bit onto a magnetic medium in a direction generally perpendicular to the magnetic medium. Since the width of the write pole determines the track width of the signal written to the magnetic medium, it would be desirable to shrink this write pole width as much as possible. However, the amount by which the write pole can be reduced has been limited by current manufacturing processes. Write poles have been constructed by depositing a magnetic write pole material full film, forming a hard mask over the write pole material, and then performing an ion mill to remove portions of the write pole that are not covered by the hard mask.

This subtractive manufacturing process has limitation as to the minimum write pole track width that can be produced. Therefore, there remains a need for a process that can produce a magnetic write pole having a desired narrow track width. Such a process would also preferably be capable of tightly controlling critical dimensions, and would be capable of producing a write pole with a desired trapezoidal shape with well controlled side wall angles.

SUMMARY OF THE INVENTION

The present invention provides a method for manufacturing a magnetic write pole in a perpendicular magnetic write head. The method allows the write pole to be constructed with a very narrow track width and well controlled critical dimensions. A seed layer is deposited over a substrate and then a photo resist layer is deposited. The photo resist is then photolithographically exposed and developed to form an opening in the photo resist layer. A magnetic material can then be deposited into the opening by electroplating to form a write pole.

After the write pole has been formed, the photo resist layer can be removed and an ion mill can be performed to remove portions of the seed layer that are not covered by the write pole.

To further reduce the width of the write pole a chemical shrink material can be deposited into the opening in the photo resist layer prior to depositing the magnetic material. The chemical shrink material and photoresist can be baked to cause a portion of the chemical shrink material to bond to the photoresist material. This narrows the opening, allowing a narrower pole to be constructed than would be possible by photolithographic patterning of the photoresist layer alone.

Another way to further reduce the track width of the write pole is to deposit a non-magnetic hard mask over the magnetic material in the opening in the photo resist mask. The photo resist mask can then be removed, and an ion mill or reactive ion mill can be performed to remove material from the sides of the write pole, with the top (or leading edge) of the write pole being protected by the hard mask.

The present invention advantageously allows a write pole to be constructed with a narrower track width than would be possible using previously available methods. In addition, critical dimensions such as track width, leading edge width, distance between the leading edge and the trailing edge and side wall angel can be carefully controlled.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
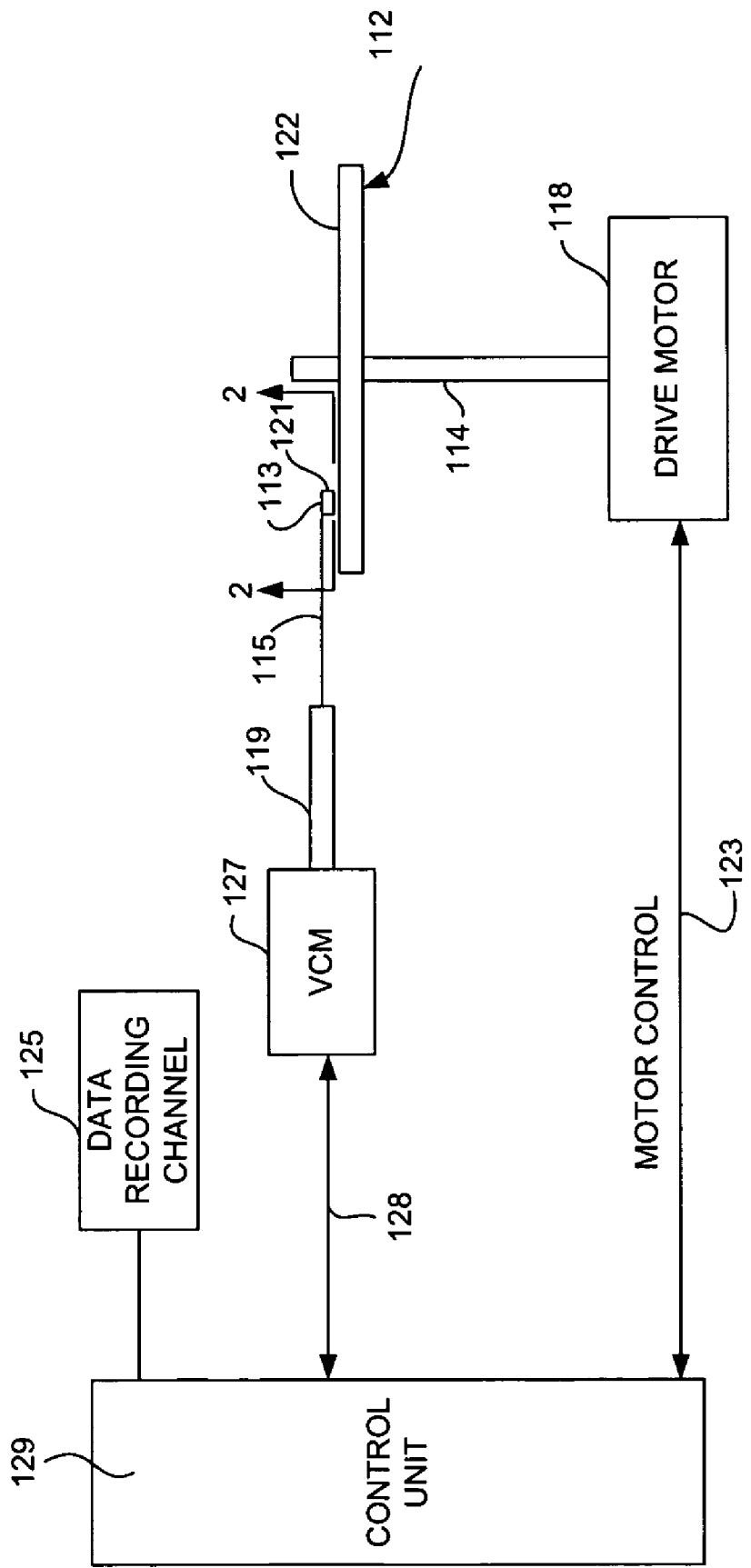
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
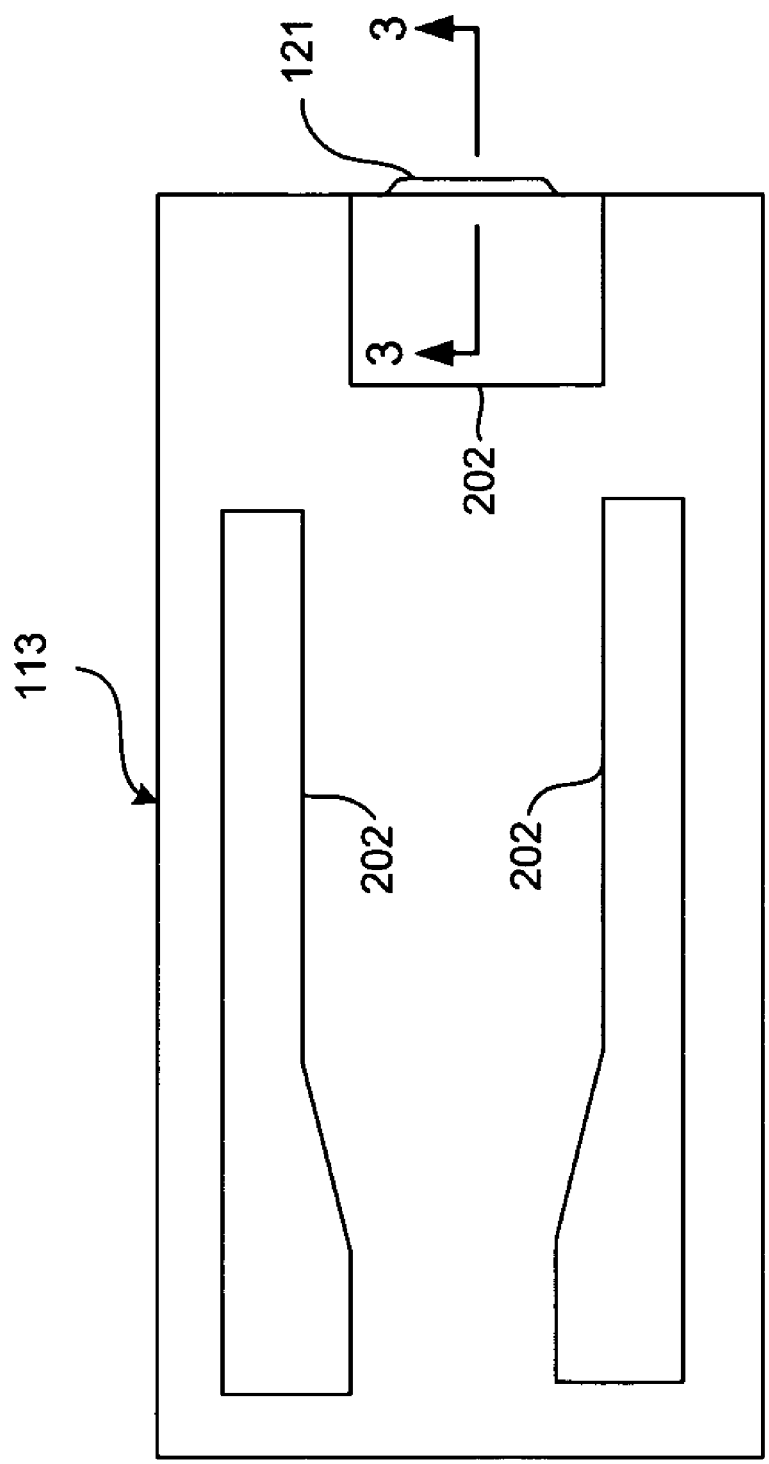
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
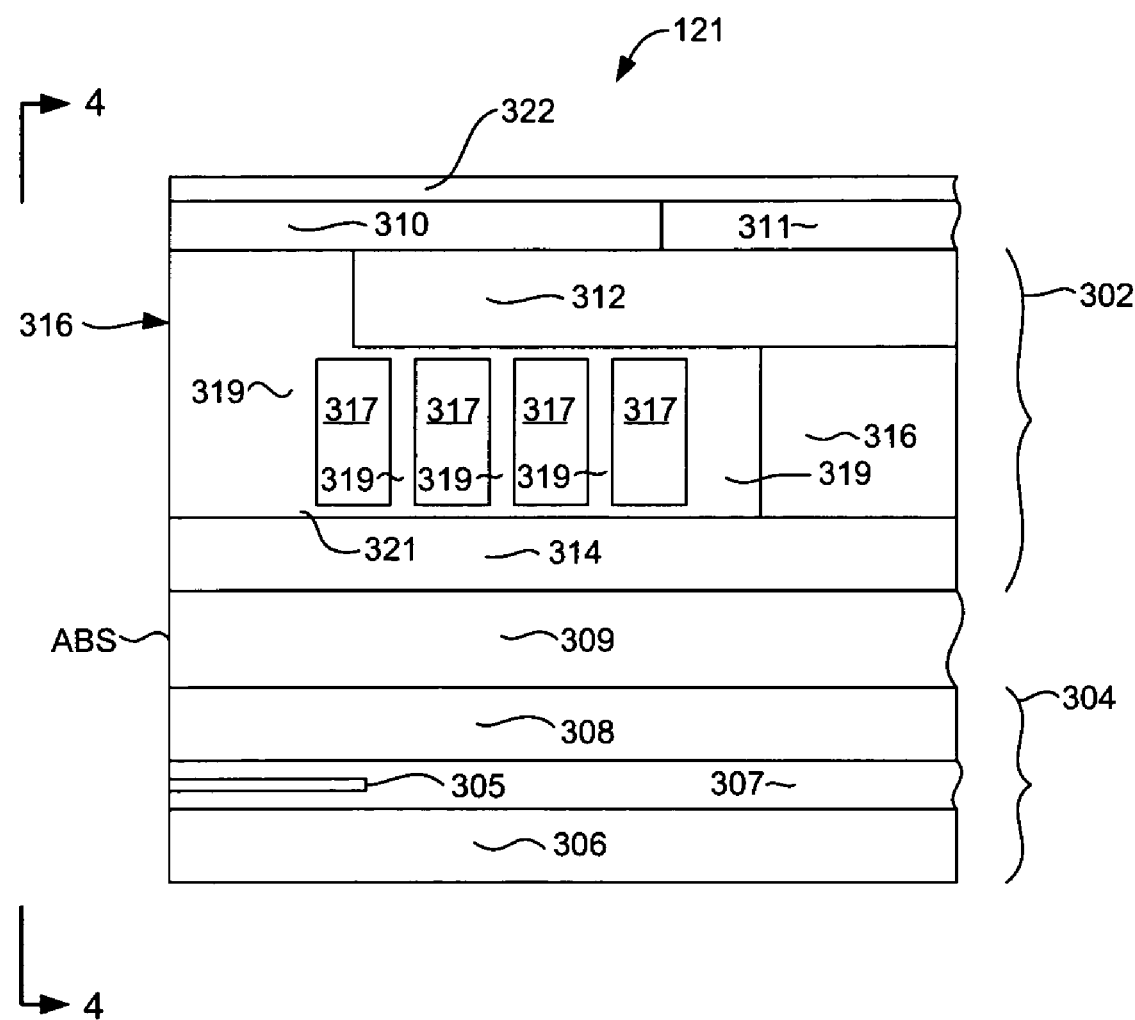
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305 could be, for example, a current in plane giant magnetoresistive senor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields, which can be constructed of for example CoFe, NiFe or sendust, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can acts as electrically conductive leads for supplying a sense current to the sensor 305.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a magnetic material. The write head 302 also includes a return pole 314 that is constructed of a magnetic material such as CoFe or NiFe and has a cross section parallel to the ABS surface that is significantly larger than that of write pole 310, as can be seen with reference to FIG. 4. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by a non-magnetic, electrically insulating material such as hard baked photoresist or alumina (coil insulation layer 319). The insulation layer 319 may consist of a single insulating material or may be several layers of the same or different materials. A hard, electrically insulating, protective layer 322, constructed of, for example alumina may be provided over the top of the head 121 to protect the head from damage from corrosion, abrasion, etc.

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). This magnetic field emitted from the write pole 310 magnetizes a relatively higher coercivity, thin, top magnetic layer on the magnetic medium. This magnetic field travels through a magnetically soft underlayer of the magnetic medium to the return pole 314, where it is sufficiently spread out that it does not erase the signal written by the write pole 310.

Figure 4:
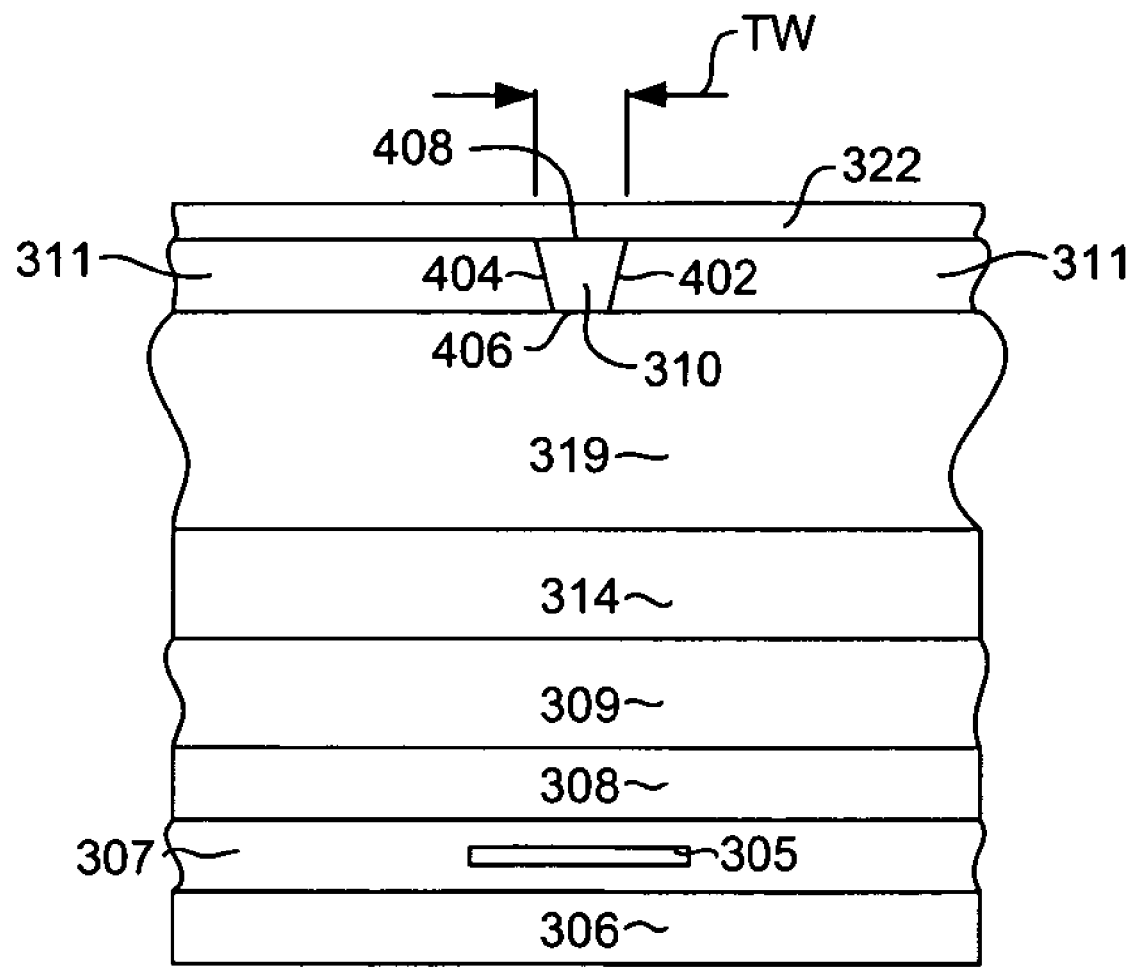
FIG. 4 is an ABS view of the magnetic write head of FIG. 3.

With reference to FIG. 4, The write pole 310 has first and second sides 402, 404, a leading edge 406 and a trailing edge 408. The leading edge 406 and trailing edge 408 each extend from the first side 402 to the second side 404. The write pole 310 is preferably constructed to have a trapezoidal or tapered shape, such that the distance between the sides 402, 404 is greater at the trailing edge 408 than at the leading edge 406. The sides 402, 404 preferably form an angle of about 80 to 82 degrees with respect to horizontal, or with respect to the surface of the substrate on which the write pole 310 is formed (i.e. the insulation layer 319). The narrowest portion of the write pole (the leading edge 406) preferably has a width about 100 nm or less. The write pole 310 has a width TW at its trailing 408 edge that defines a track width of the sensor. The track width TW can be 90-180 nm or preferably 160 nm or less. The distance from the leading edge 406 to the trailing edge 408 can be about 200 nm. The write pole 310 can be constructed of several magnetic materials, but is preferably constructed of a lamination of magnetic layers such as CoFe separated by thin non-magnetic layers such as Cu or Ru. Other materials can be used as well.

Figure 5:
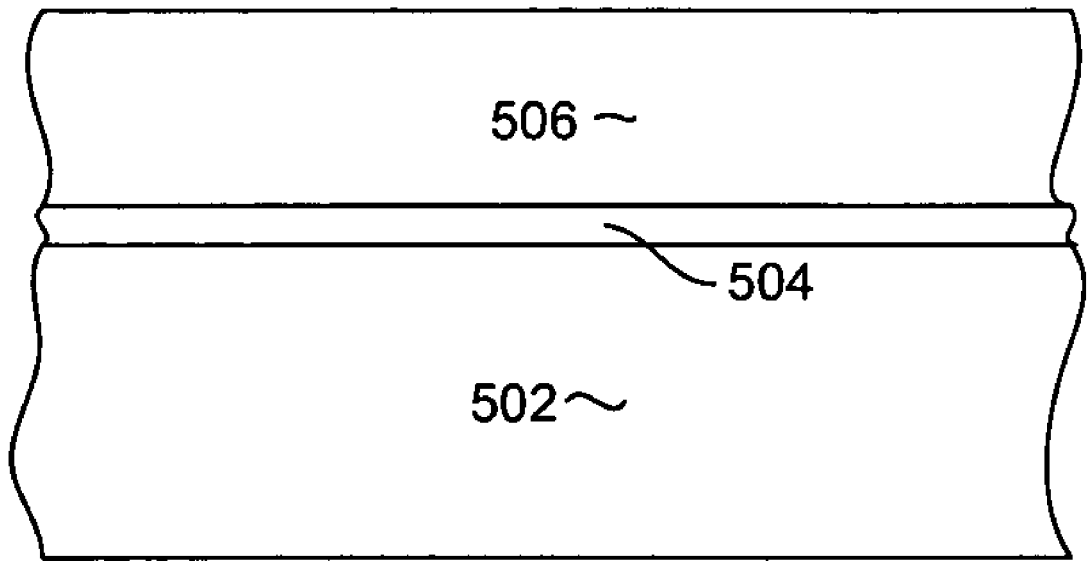
FIGS. 5-8 are ABS views of a portion of a magnetic write head in various intermediate stages of manufacture illustrating a method of manufacturing a magnetic write pole according to an embodiment of the invention.

With reference now to FIGS. 5-8 a method for manufacturing such a write head 310 is described. With particular reference to FIG. 5, a substrate 502 is provided. The substrate can include the insulation layer 319 and also the shaping layer 312 (FIG. 3) both of which have been planarized (such as by chemical mechanical polishing) to form a smooth coplanar surface. An electrically conductive seed layer 504, such as Rh is deposited, such as by sputter deposition. A resist layer 506 is then deposited onto the seed layer 504. The resist 506 is preferably a fixed angle photo resist applied by spin coating.

Figure 6:
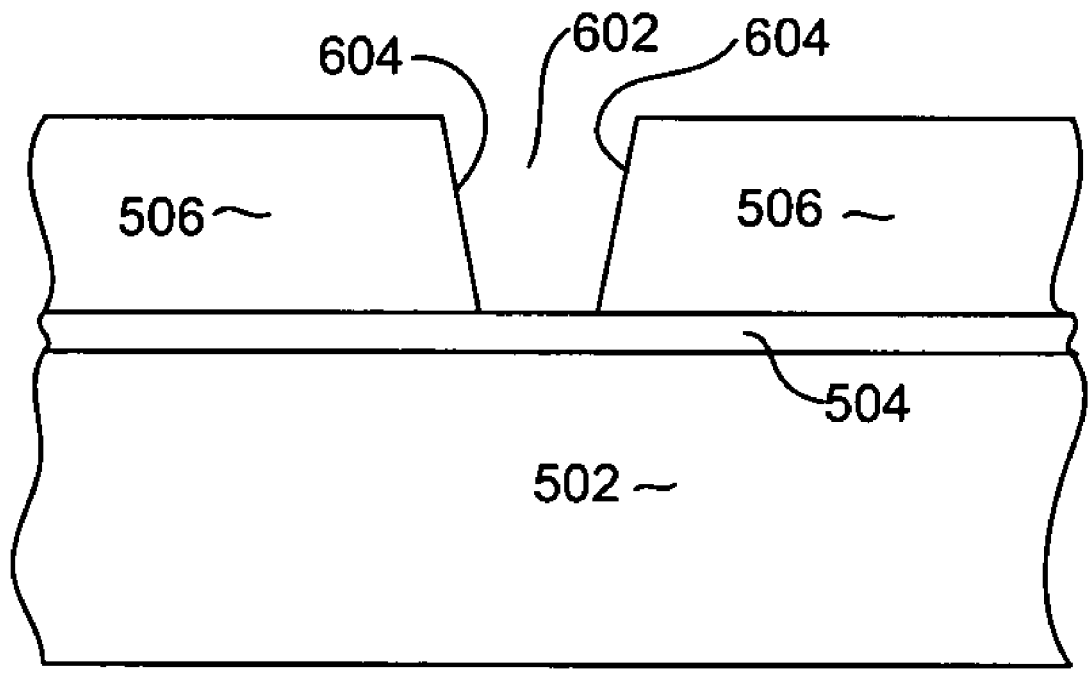

Then, with reference to FIG. 6, the resist layer 506 is photolithographically exposed and developed in order to pattern an opening 602 having angled side walls 604, The resist 506 is preferably a deep ultraviolet (DUV) sensitive resist, designed to reliably form side walls 604 that define an angle of 78-82 degrees with respect to horizontal (ie. with respect to the surface of the substrate 502, and or seed layer 504.

Figure 7:
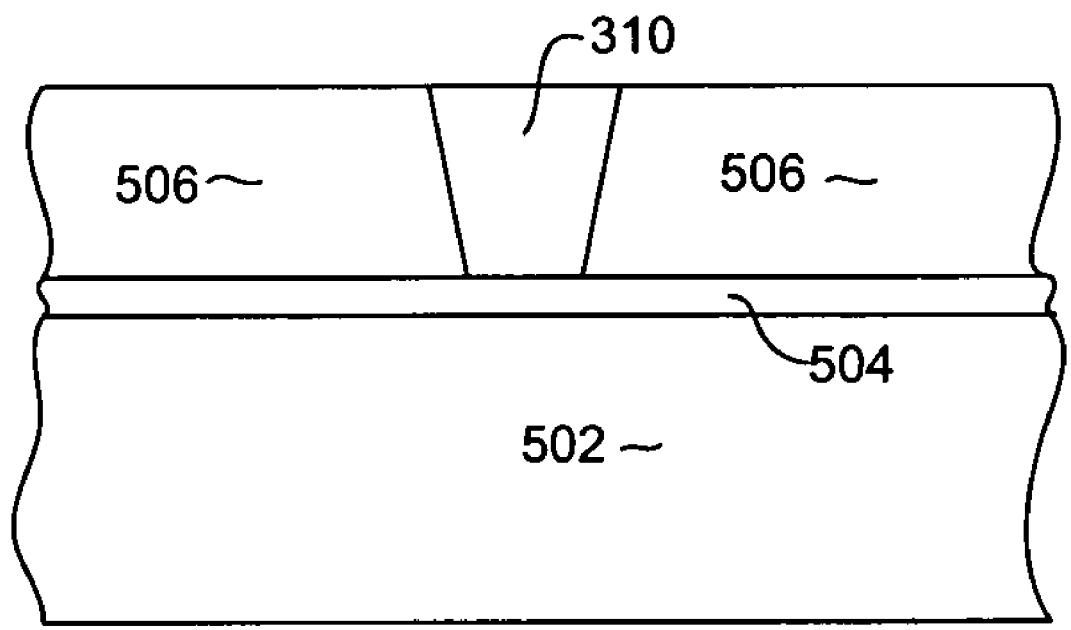
Figure 8:
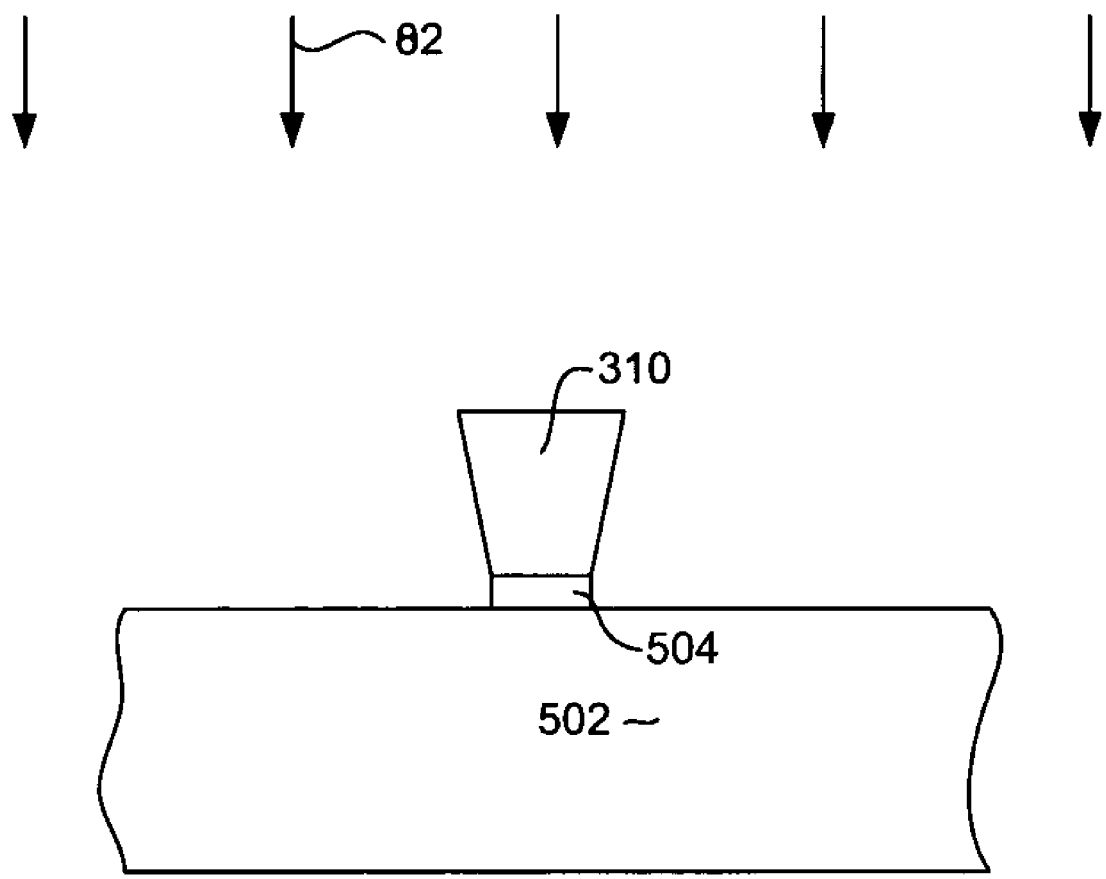

With reference now to FIG. 7, a magnetic material can be deposited by electroplating, using the seed layer 504 as an electroplating seed to form a write pole 310. The write pole 310 can be formed by alternately depositing layers of magnetic material such as CoFe and layers of non-magnetic material such as Ru or Cu. Then, with reference to FIG. 8 the resist layer 506 can be removed (stripped) such as by a chemical lift-off process. A material removal process 802 such as ion milling can then be performed to remove portions of the seed layer 504 not protected by the write pole 310.

Figure 9:
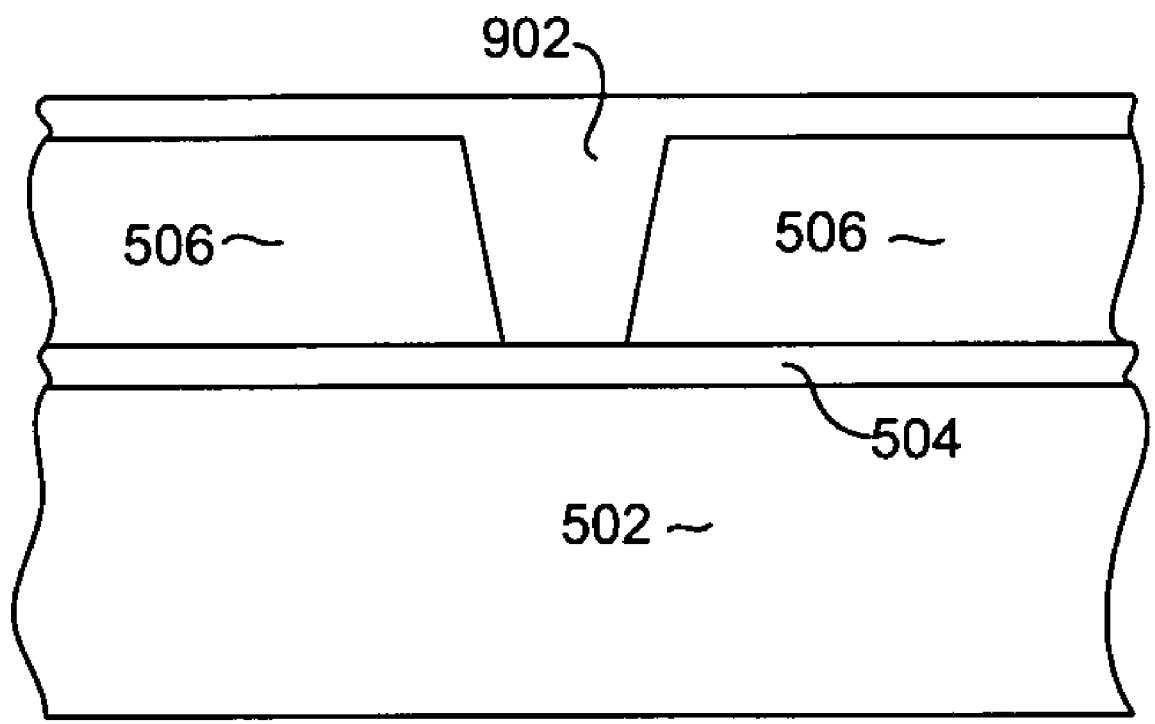
FIGS. 9-11 are ABS views illustrating a method of manufacturing a magnetic write pole according to an alternate embodiment of the invention.
Figure 10:
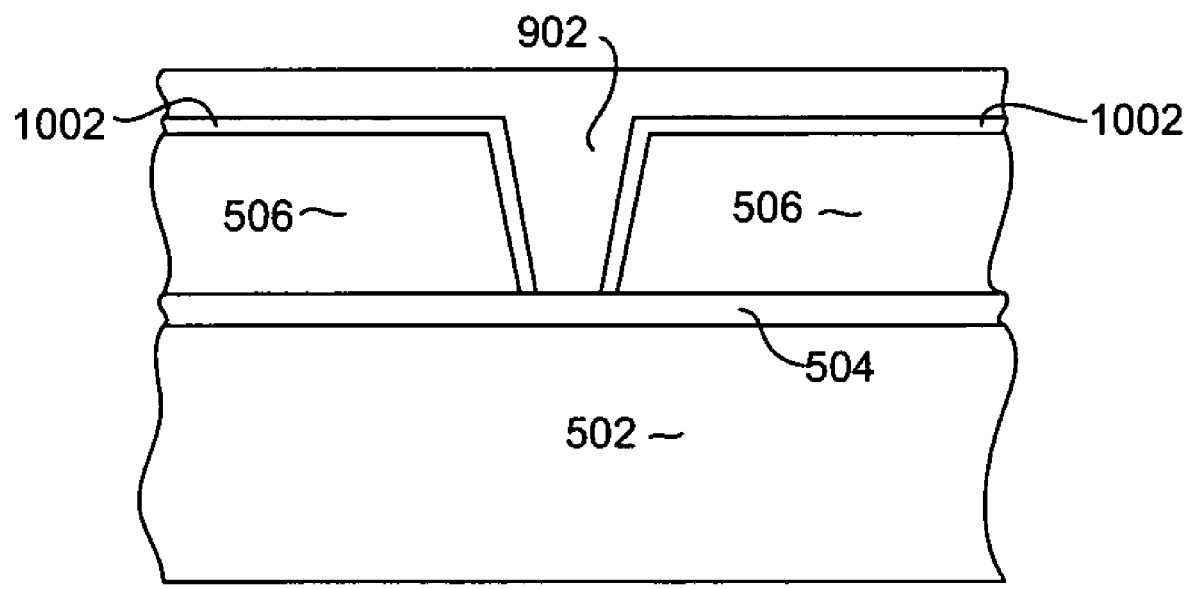
Figure 11:
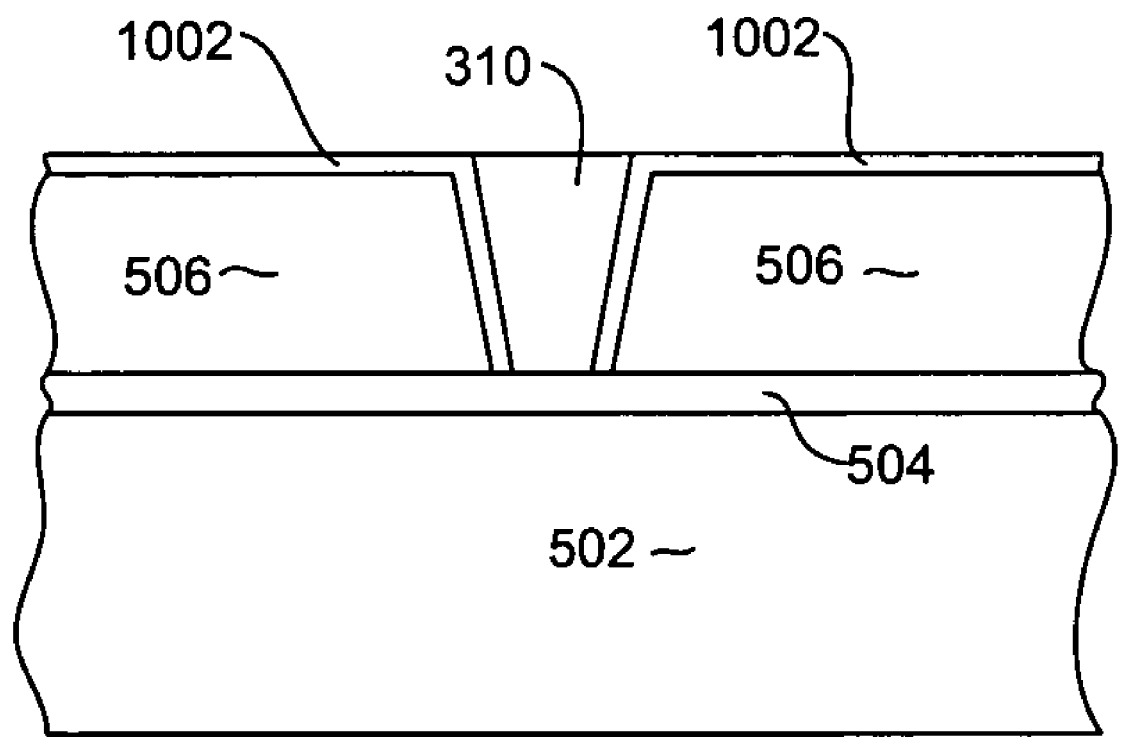

With reference now to FIGS. 9-11, an alternate method for constructing a pole 310 is described. With particular reference to FIG. 9, a resist layer 506 is patterned and developed as described earlier with reference to FIG. 6. Then, a chemical shrink material 902 is deposited. The chemical shrink material 902 can be applied with a spin coating tool and baked. As seen in FIG. 10, the baking process causes the shrink material to cross link with the residual acid in the original photo resist 506, growing a skin 1002. The patterned resist can be blanket exposed to create more acid if necessary to initiate more cross linking between the shrink material 902 and the resist 506. A water rinse can be used to remove the remaining (not crosslinked) shrink material 902 that was not bonded with the resist 506, leaving the skin 1002. This results in a narrower opening. Then, with reference to FIG. 11, magnetic write pole material can be deposited by electroplating to form a write pole 310. As mentioned, the cross linked skin 1002 of the shrink material results in a narrower opening, thereby resulting in a narrower plated write pole 310. After the write pole 310 has been formed, the resist 506 and shrink material skin 1002 can be removed by chemical liftoff and an ion mill can be performed to remove the seed layer as described in FIG. 8.

At least a couple of shrink materials 902 and related processes can be used. For example, the shrink material can be a polymer as described above that reacts with the surface of the underlying resist 506. Exposing the resist generates acid and causes the polymer shrink material 902 to react with that acid to bond to the resist to a desired thickness based on the processing. This can be characterized as Polymer Growth.

Another type of shrink material 902 uses a more mechanical process. In this case, the coated shrink material hardens as it is baked and creates a negative image of the resist pattern. This top coat (baked shrink material 902) shrinks faster in the plane of the wafer than in the vertical (normal) direction. As it continues to heat up, the resist melts and reflows. This reflowed resist 506 expands in the plane of the wafer (ie. in the horizontal or x/y dimension) in order to relieve the stress induced by the baked shrink material 902. This mechanism can be referred to as Controlled Resist Reflow.

Figure 12:
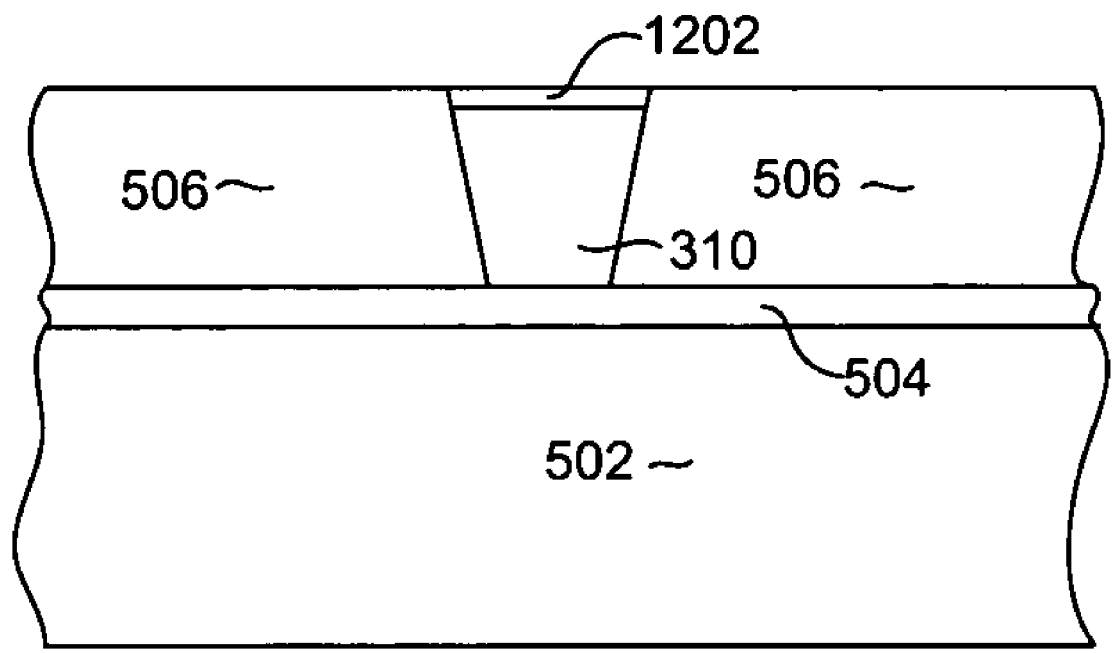
FIGS. 12-13 are ABS views illustrating a method of manufacturing a magnetic write pole according to another embodiment of the invention.
Figure 13:
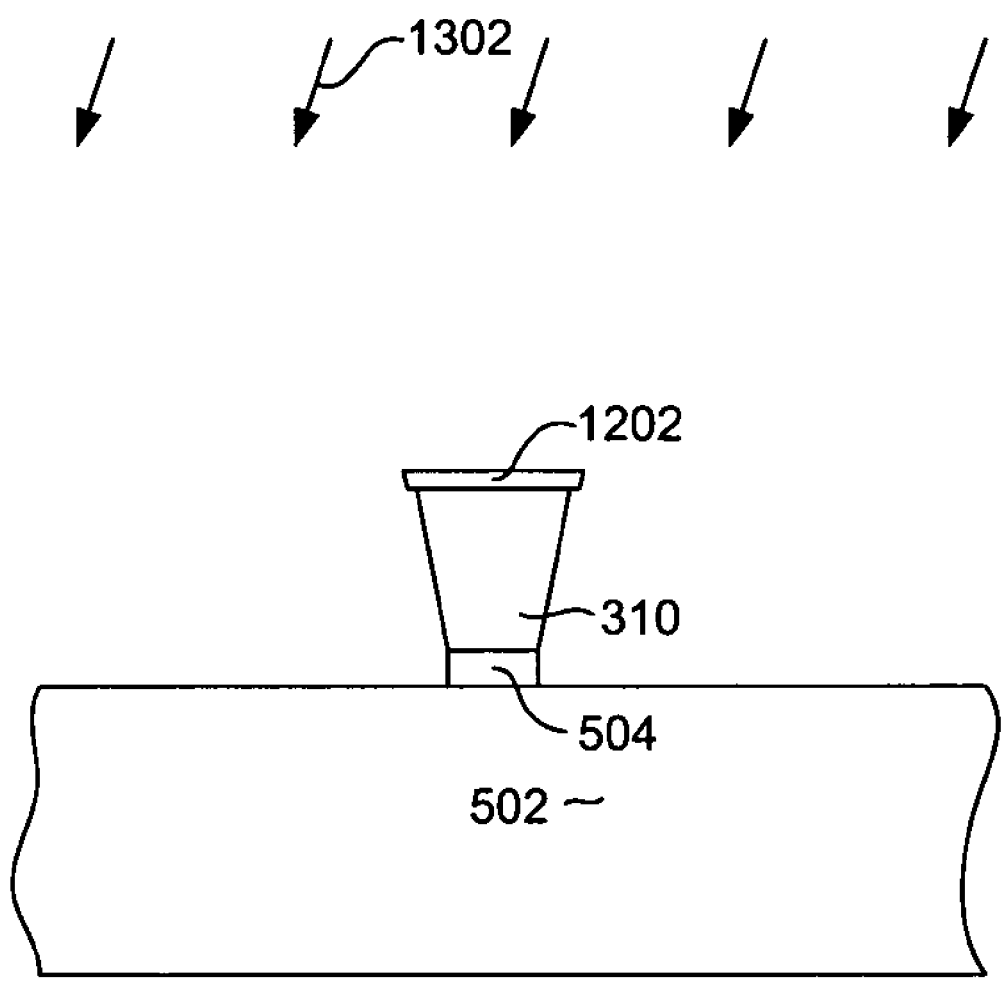

With reference now to FIGS. 12, and 13, yet another method is possible for manufacturing a write pole having a very narrow track width and well controlled critical dimensions. With particular reference to FIG. 12, a photo resist frame 506 is formed as described earlier in FIG. 6. A magnetic write pole material can then be electroplated to form a write pole 310. A hard mask layer 1202 can then be deposited, preferably also by electroplating, over the write pole 310. A suitable material for the hard mask 1202 would be a non-magnetic material that is resistant to ion milling and that can be deposited by electroplating. The hard mask 1202 can therefore be constructed of, for example, Rh, Ir or certain other metals.

With reference to FIG. 13, the photo resist frame 506 is removed, such as by a chemical lift off. An ion mill 1302 is performed to remove side portions of the write pole 310, with the top (trailing edge) of the write pole 310 being protected by the hard mask 1202. The ion mill 1302 also removes portions of the seed layer 504 that are not covered by the write pole 310. If the hard mask were not present, the ion milling 1302 would reduce the thickness (ie. height as shown in FIG. 13) of the write pole 310, and would also cause undesirable rounding of the top, or leading edge, of the write pole 310. Although the ion milling 1302 may cause rounding and consumption of the hard mask 1202, because this hard mask layer 1202 is non-magnetic, this consumption and rounding of the hard mask 1202 will not affect performance of the write head 310.

The ion milling 1302 advantageously removes material from the sides of the write pole 310 narrowing the track width of the write pole. Various ion milling processes can be used to optimize the track width reduction. For example, the ion milling 1302 can be an angled ion mill (ie. not normal to the surface of the substrate) or a sweeping ion mill. A reactive ion mill can also be used. After the ion mill 1302 has been completed, an insulation layer such as alumina (not shown in FIG. 13) can be deposited to protect the write pole 310.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic data recording, the method comprising:
    providing a substrate;
    depositing an electrically conductive seed layer over the substrate;
    depositing a photo resist material;
    photolithographically exposing and developing the photo resist material to form an opening in the photo resist material;
    depositing a chemical shrink material;
    baking the photoresist material to cause a portion of the shrink material to bond with the photo resist material;
    blanket exposing the photo resist to generate acid for increasing bonding between the chemical shrink material and the photo resist;
    removing an un-bonded portion of the chemical shrink material leaving the portion of the chemical shrink material that has bonded to the photo resist material; and
    electroplating a magnetic material into the opening in the photo resist material to from a write pole.

2. The method as in claim 1 further comprising, after electroplating the magnetic material into the opening in the photo resist material:
    removing the photo resist material and chemical shrink material; and
    performing an ion mill to remove portions of the seed layer that are not covered by the write pole.

3. The method as in claim 1 wherein the photo resist is a fixed angle photo resist and wherein the exposing and developing produces an opening in the photo resist that has a side wall that defines an angle of 78 to 82 degrees with respect to the substrate.

4. The method as in claim 1 wherein the electrically conductive seed layer is non-magnetic.

5. The method as in claim 1 wherein the electrically conductive seed layer comprises Rh.

6. A method for manufacturing a magnetic write head for perpendicular magnetic data recording, the method comprising:
    providing a substrate;
    depositing an electrically conductive seed layer over the substrate;
    depositing a photo resist material:
    photolithographically exposing and developing the photo resist material to form an opening in the photo resist material;
    depositing a chemical shrink material;
    baking the photoresist material to cause a portion of the shrink material to bond with the photo resist material;
    removing an un-bonded portion of the chemical shrink material leaving the portion of the chemical shrink material that has bonded to the photo resist material; and
    electroplating a magnetic material into the opening in the photo resist material to from a write pole;
    wherein the removing an un-bonded portion of the chemical shrink material comprises rinsing in water.

* * * * *